(12) United States Patent
Wainfan et al.

(10) Patent No.: US 9,937,999 B2
(45) Date of Patent: Apr. 10, 2018

(54) DEPLOYABLE PROPELLER

(71) Applicant: Northrop Grumman Systems Corporation, Falls Church, VA (US)

(72) Inventors: Barnaby S. Wainfan, Long Beach, CA (US); Stephen D. Johnson, Laguna Niguel, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 428 days.

(21) Appl. No.: 14/727,045

(22) Filed: Jun. 1, 2015

(65) Prior Publication Data
US 2016/0347441 A1    Dec. 1, 2016

(51) Int. Cl.
B64C 27/50 (2006.01)
F03D 1/06 (2006.01)
B64C 11/28 (2006.01)
B64C 11/04 (2006.01)
(Continued)

(52) U.S. Cl.
CPC .............. *B64C 11/28* (2013.01); *B64C 11/04* (2013.01); *B64C 27/46* (2013.01); *B64C 27/50* (2013.01); *B64C 2027/4736* (2013.01)

(58) Field of Classification Search
CPC ........ B64C 2201/102; B64C 2201/108; B64C 2201/201; B64C 2201/084; B64C 11/28; B64C 27/50; B64C 27/055; B64C 27/33; B64C 27/35; B64C 27/37; B64C 27/45; B64C 3/546; B64C 11/04; F03D 1/0658; F03D 1/0675; F03D 7/0236; F03D 1/06; F05B 2240/40; F05B 2240/302; F05B 2240/31; F05B 2240/311; F05B 2240/312; F05B 2240/3121; F05B 2240/2021;
(Continued)

(56) References Cited

U.S. PATENT DOCUMENTS 1,517,865 A * 12/1924 Schiesari .............. B64C 11/006
                                                                 244/65
1,686,969 A * 10/1928 Hebden .................... H02B 1/38
                                                                 16/250
(Continued)

FOREIGN PATENT DOCUMENTS

DE          1960262       6/1971
DE          3246635       6/1984
WO    WO 2014035518 A2 *  3/2014 ........... B64C 39/024

OTHER PUBLICATIONS

Bilgen, K. et al; Morphing Wing Micro-Air-Vehicles via Macro-Fiber-Composite Actuators; 48th AIAA/ASME/ASCE/AHS/ASC Structures, Structural Dynamics, and Materials Conference, Apr. 23-26, 2007, Honolulu, Hawaii.
(Continued)

Primary Examiner — Logan Kraft
Assistant Examiner — Joshua R Beebe
(74) Attorney, Agent, or Firm — Patti & Malvone Law Group, LLC

(57) ABSTRACT

A propeller which can be folded and stowed in compact form and then deployed for powered flight is disclosed. The deployable propeller has two or more blades, and each blade is composed of multiple segments which are disengaged when stowed and then interlock when deployed to form an efficient blade. The segmented deployable propeller retains all effective area to the spinner radius.

20 Claims, 4 Drawing Sheets

(51) Int. Cl.
*B64C 27/46* (2006.01)
*B64C 27/473* (2006.01)

(58) Field of Classification Search
CPC ...... F05B 2240/2022; F05B 2240/2023; F05B 2260/50
See application file for complete search history.

(56) References Cited

U.S. PATENT DOCUMENTS

| | | | | |
|---|---|---|---|---|
| 1,867,798 | A * | 7/1932 | Arndt | F16C 11/04 16/374 |
| 2,869,649 | A * | 1/1959 | Lux | B64C 27/50 416/142 |
| 3,321,021 | A * | 5/1967 | Girard | B64C 27/50 174/42 |
| 3,637,168 | A * | 1/1972 | Ryan | B64C 27/46 244/123.1 |
| 4,139,171 | A | 2/1979 | Harris | |
| 4,640,477 | A * | 2/1987 | Pace | B64C 7/00 244/130 |
| 4,838,502 | A * | 6/1989 | Pinson | F42B 10/02 244/130 |
| 5,463,794 | A | 11/1995 | Erland | |
| 6,334,235 | B2 | 1/2002 | Duperray et al. | |
| 7,097,133 | B2 | 8/2006 | Elam | |
| 7,435,032 | B1 | 10/2008 | Murphey et al. | |
| 8,434,196 | B1 | 5/2013 | Murphey et al. | |
| 2009/0274557 | A1 * | 11/2009 | Vasyl | B64C 11/003 416/89 |
| 2010/0104437 | A1 | 4/2010 | Caraballoso et al. | |
| 2011/0155840 | A1 * | 6/2011 | Lind, Jr. | B60F 3/00 244/13 |
| 2012/0051912 | A1 * | 3/2012 | Shi | F03D 1/0633 416/132 B |
| 2013/0099050 | A1 * | 4/2013 | Sanderson | B64C 3/56 244/49 |
| 2014/0003940 | A1 * | 1/2014 | Opaits | F03D 1/04 416/23 |
| 2014/0239118 | A1 * | 8/2014 | Sapir | B64C 39/024 244/49 |

OTHER PUBLICATIONS

Paulos, J. et al; An underactuated propeller for attitude control in micro air vehicles; Intelligent Robots and Systems (IROS), 2013 IEEE/RSJ International Conference on, pp. 1374-1379; Nov. 3-7, 2013; 978-1-4673-6358-7; Tokyo, Japan.

Yu, Y. et al; Investigation on adaptive wing structure based on shape memory polymer composite hinge; Proc. SPIE 6423, International Conference on Smart Materials and Nanotechnology in Engineering, 6423, pp. 64231D-1-64231-D7, (Nov. 1, 2007); doi:10.1117/12.779394.

* cited by examiner

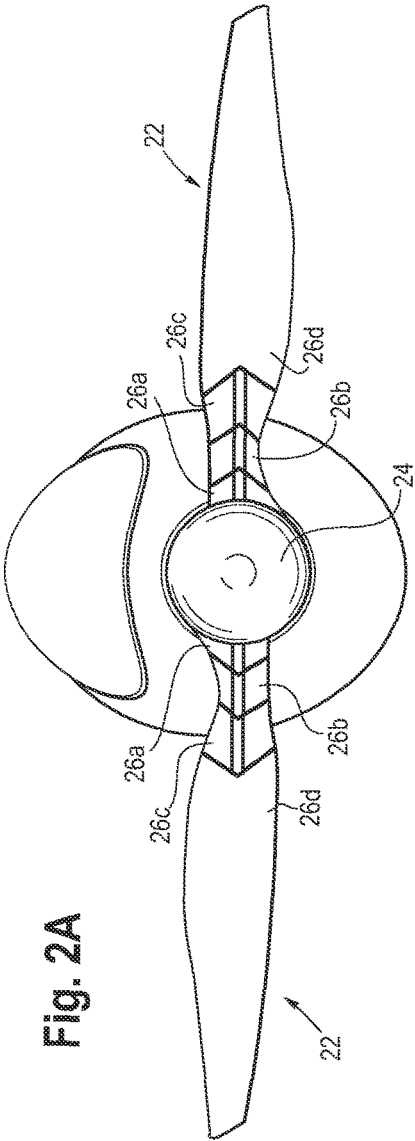
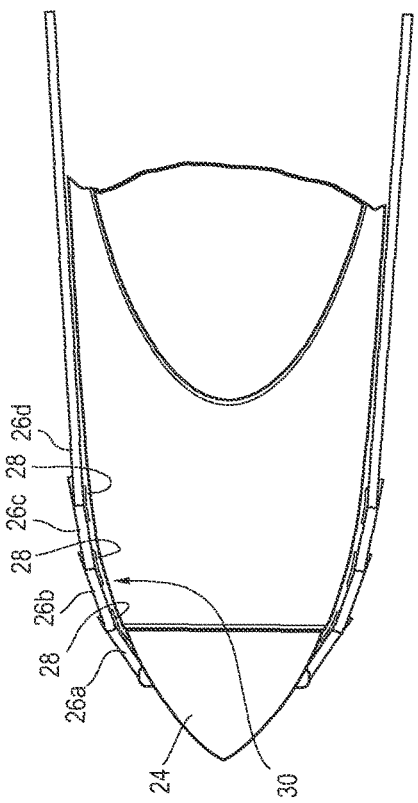
Fig. 2A
Fig. 2B

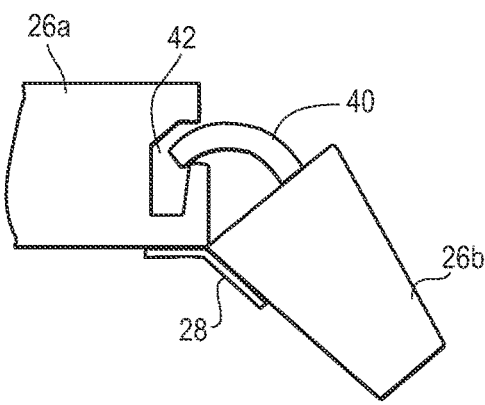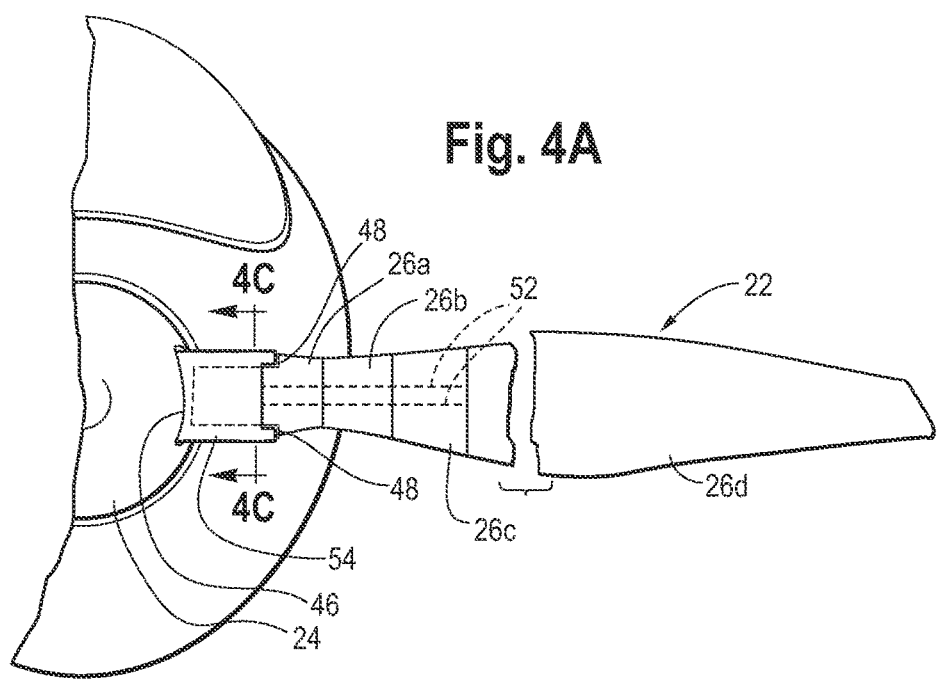

DEPLOYABLE PROPELLER

BACKGROUND

The invention relates generally to propellers for UAVs (unmanned aerial vehicles) and more particularly to collapsible propellers.

Collapsible, or folding, propellers are known in the prior art. Most commonly, prior art folding propellers use a single mechanical hinge close to the yoke of the propeller to deploy each blade. As shown in FIGS. 1A and 1B, a prior art folding propeller 10 includes one or more blades 12, each attached to a central yoke 16 by means of a hinge 14. Central yoke 16 is attached to shaft (not shown) which connects to a motor for causing rotation of propeller 10. FIG. 1A shows propeller 10 in a folded configuration, while FIG. 1B shows propeller 10 in an opened configuration.

Single hinge 14 in each blade 12 does not allow blade 12 to completely conform to the surface upon which it is stowed. Depending on the application, the stowed surface may have a variety of forms, including the nose of an aircraft, for example. Because of the required twist in the blade, an aerodynamically-designed blade is not flat, and a single hinge does not permit the blade to follow an arbitrary curvature. Additionally, the diameter of the yoke used in prior art folding propellers represents lost propeller disk area, and this can be significant if hinging at larger radii is required.

Thus, a need exists for more flexibility and better shape conformity in folding propellers. A need further exists for a folding propeller with a smaller central yoke and an improved hinging mechanism.

SUMMARY

The invention in one implementation encompasses a propeller which can be folded and stowed in compact form and then deployed for powered flight. Each blade is composed of multiple segments which are disengaged when stowed and then interlock when deployed to form an efficient blade. The segmented deployable propeller retains all effective area to the spinner radius.

One implementation of the invention is a deployable propeller having a central hub, two or more blades, each rotatably connected to said central hub by a hinge where each blade further comprising two or more segments, flexibly connected to each other using a tensile material such that the blade folds out of the plane of rotation for storage.

In a further embodiment, the deployable propeller includes a telescoping faring covering said hinge, said faring resting in a channel in the central hub when the propeller is stored, said faring further sliding over said hinge to cover a gap between the central hub and the first segment when the propeller is deployed.

In a further embodiment, the invention encompasses a collapsible propeller blade having two or more segments and a flexible hinge connecting adjacent segments.

In any of the above embodiments, adjoining edges of each segment have complementary curvatures, such that mating segments of each blade interlock when the propeller is deployed. The tensile material may be a flexible cloth or tape hinge connecting at least each segment. In an alternative, the tensile material may be one or more tensile fibers that extend through the center of each segment. In a further embodiment, the tensile fibers are connected to a spool in the central hub, said spool used to maintain tension on the tensile fiber when the propeller is deployed.

In any of the above embodiments, a hub facing surface of each segment includes a hook and a tip facing surface of each segment further comprises a slot for receiving the hook from a mating segment as the propeller is deployed, wherein the blade segments are held in place an aligned correctly.

In any of the above embodiments, adjoining edges of each segment have complementary curvatures, such that mating segments of each blade interlock when the propeller blade is deployed.

Another implementation of the invention encompasses an aircraft having a fuselage and a deployable propeller as described above.

DESCRIPTION OF THE DRAWINGS

Features of example implementations of the invention will become apparent from the description, the claims, and the accompanying drawings in which:

FIG. 2A shows a top view of an embodiment of a deployable propeller according to the present invention.

FIG. 2B shows a side view of the deployable propeller of FIG. 2A.

FIG. 3 shows an alternative embodiment of the deployable propeller of FIG. 2A.

FIGS. 4A and 4B shows a telescoping faring for use with the propeller of FIGS. 2A, 2B and 3.

DETAILED DESCRIPTION

Figure 1A:
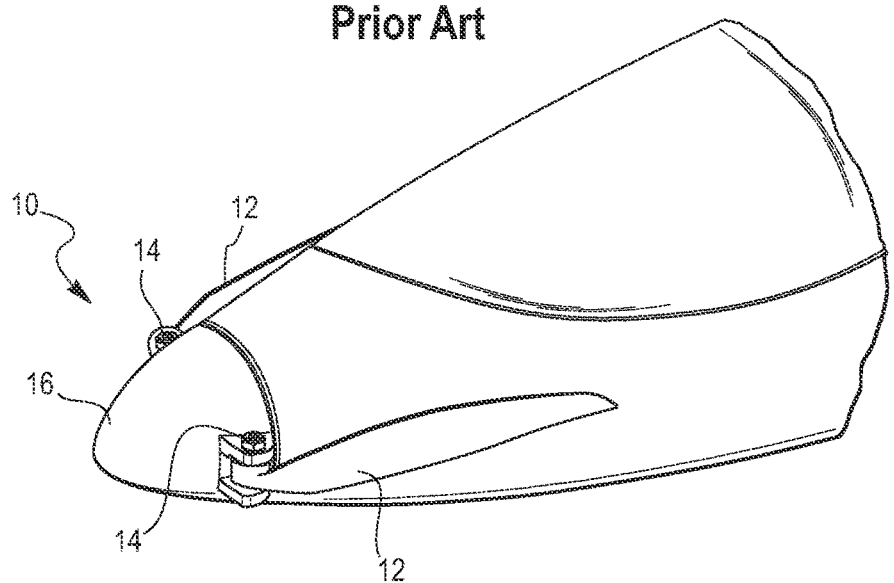
FIG. 1A shows a prior art folding propeller in a folded configuration.
Figure 1B:
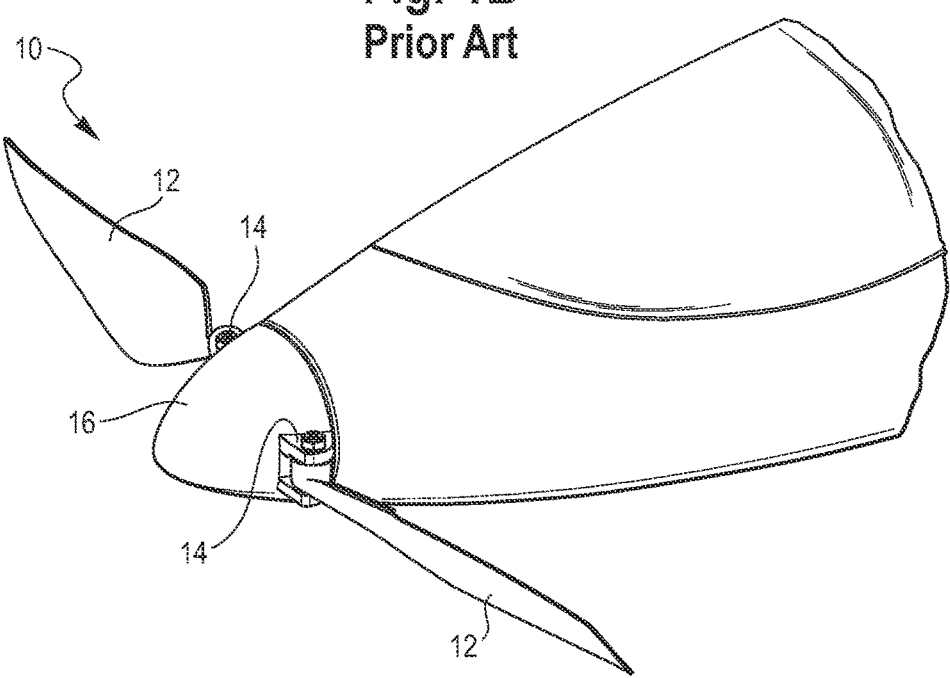
FIG. 1B shows a prior art folding propeller in a deployed configuration.

A deployable propeller is described which features blades having two or more segments, that are interconnected by flexible, high strength tensile fibers. The fibers permit the blades of the propeller to fold and conform to arbitrarily-curved surfaces for stowage. The segments are designed to unfold into the plane of rotation once rotation is begun, and interlock by chevron, curved, or other shaped interfaces which cause each segment to key into its unique position, setting the desired blade segment angle. When the propeller rotates, the segments are held in place by the tensile fibers as will be described in connection with several embodiments below.

A deployable propeller 20 according to an embodiment of the present invention is shown in FIGS. 2A and 2B. FIG. 2A shows a top view of propeller 20. Although two blades are shown, any number of blades could be used depending on the application. Blades 22 include an outer most section 26d which is attached to central yoke 24 by a plurality of hinged segments 26a, 26b and 26c. As shown in FIG. 2A, the segments have interlocking contours that cause blade 22 to auto-align when deployed. Although a v-shaped contour is depicted, any contour that causes the segments to nest in a unique position could be used.

FIG. 2B shows a side view of propeller 20 of FIG. 2A. Segments 26a, 26b, 26c and 26d are connected by means of a flexible hinge 28. Hinge 28 can be made from, for example, high-tensile strength fibers, cloth or tape. Hinge 28 is shown as separate hinges between each segment but could also be one single component along the length of the blade. These tensile components are flexible enough to allow the fibers between blade segments to bend while the propeller is not rotating. Although a blade with four segments is shown, any number of segments greater or less than four can be used. Increasing the number of blade segments increases the conformity to the stowing surface, for example the nose of an aircraft as indicated at 30, significantly reducing the volume required for the stowed blade. This feature also reduces the aerodynamic drag of the propeller if the propeller is collapsed during flight, for example, while gliding.

In both of FIGS. 2A and 2B, a relatively flat blade is depicted for ease of representation and to effectively illustrate the inventive concepts. Any shape of the blade or degree of twist may be used. Likewise, the hinges between segments may be at an angle on a twisted blade so that when folded, the blade follows a radial line in order to get the best flatness when stowed. In other words, the blade spirals around the nose of the aircraft when folded. The shape and twist of the blade depends on the application of the aircraft and what flexibility is required.

In a preferred embodiment, the hinge is located on the back, or pressure, side of the propeller. In other words, on the side away from the direction of thrust. In this configuration, the collapsed blades are capable of folding down over a large variety of shapes and structures. The segmented blade of the current invention allows the stowed propeller to conform to a smaller space than current single-hinge designs, and allows the deployed blade to have a more aerodynamically efficient shape than single-hinged blades. Aerodynamic forces or thin strips of spring material can position the blade to a preferred position, overcoming for instance, the blade weight. When employed as a "pusher propeller" the hinge would need to be on the suction side to allow the blade to fold forward, or a hook interlocking segment described below, would be used.

In an alternative embodiment, the mating surfaces of the blades have hook-shaped, interlocking portions to hold the segments in place and assist in alignment of the blade segments, as shown in FIG. 3. Representative segments 26a and 26b from FIG. 2A, for example, are shown connected by hinge 28. Hook 40 is attached to segment 26b and is inserted into slot 42 in segment 26a as the propeller is deployed.

Figure 4B:
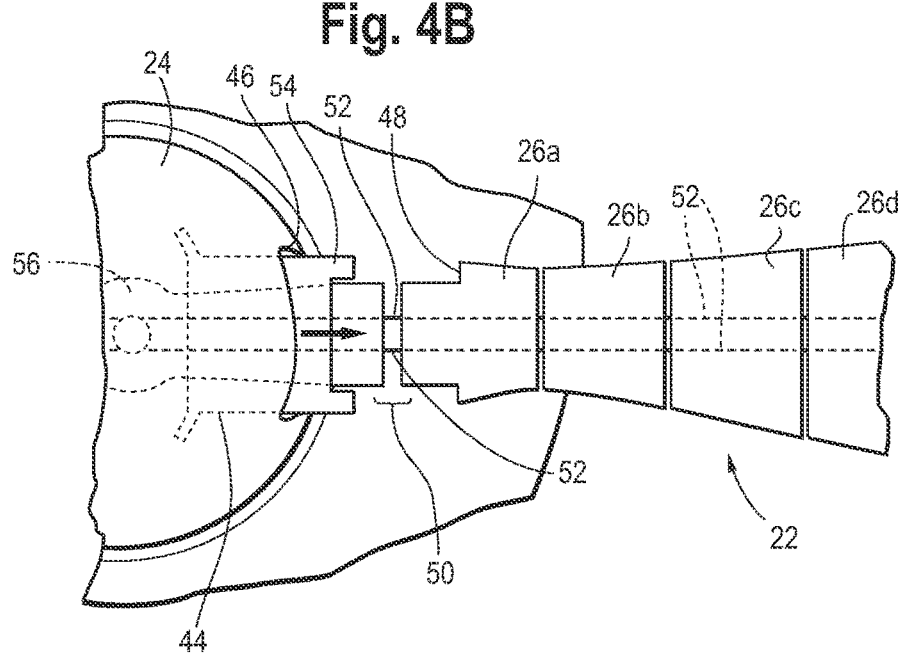
Figure 4C:
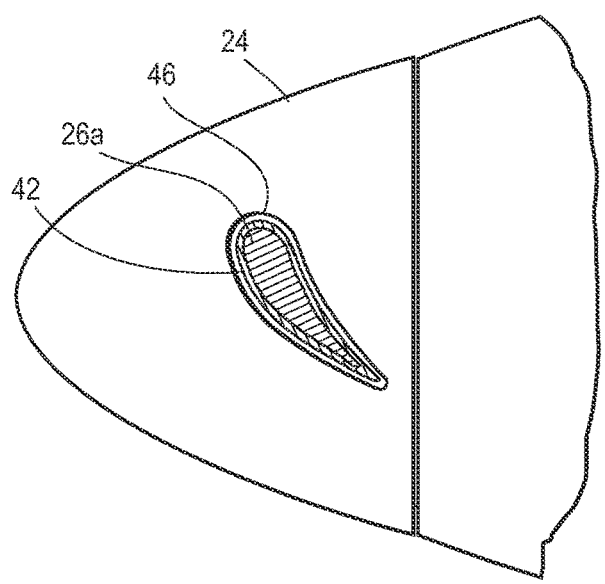
FIG. 4C shows a side view of the propeller of FIGS. 4A and 4B.

Another embodiment of the invention is shown in front view in FIGS. 4A and 4B. In this embodiment, the segments are arranged on one or more tensile fibers 52 near the center of blade segments 26a, 26b, 26c and 26d. Telescoping faring 54 is a sleeve that slides over the hinge (not shown) to cover gap 50 that forms when all the segments are extended during rotation. Prior to deployment, faring 54 would be located as shown in FIG. 4B. Faring 54 is located inside central yoke 24 around propeller base 56. As blade 22 begins to rotate and deploy, centrifugal forces would act on faring 54 to cause it to slide out of channel 46 as shown in FIG. 4A, which depicts so that it nests in notch 48 of segment 26a and covers gap 50. A side view of central yoke 24 is shown in FIG. 4C. In an alternative embodiment, innermost segment 26a is designed to slide into the central yoke 24 a short distance to provide the slack in tensile fibers 40 needed for manipulating the propeller for stowage. This would eliminate the need for a separate sleeve, or faring.

In yet another alternative configuration, a deployable propeller as shown in FIGS. 4A and 4B, having tensile fibers near the center of the blades, adjusts each fiber length via a spool at the hub that rotates to take up the excess fiber and applies a tension to the fiber. Alternatively, the fiber can be adjusted via rotation. Although the deployable propeller according to the present invention has been shown in a folded configuration, in a further embodiment the blade segments would be rolled into a coiled shape if the airfoil required can be achieved with a cambered, thin material.

This deployable propeller is suitable for UAVs and aircraft which must deploy a propeller during flight. The inventive deployable propeller concept is useful in aircraft that require a storable propeller that can also be deployed during flight. Further, using flexible material as a hinge combined with a segmented blade allows more compact stowage and a more efficient blade shape. It is also mechanically simpler than a conventional hinge (does not apply to the hook type).

If used and unless otherwise stated, the terms "upper," "lower," "front," "back," "over," "under," and similar such terms are not to be construed as limiting the invention to a particular orientation. Instead, these terms are used only on a relative basis.

An illustrative description of operation of the apparatus 100 is presented, for explanatory purposes.

In a first scenario, an aircraft is launched with the propeller in a collapsed configuration, for example, from a tube or other storage container. The propeller is deployed after launch and stays under power for the entire mission. When launching the aircraft from a container, it is very beneficial to be able to collapse the aircraft into as small a diameter as possible.

In a second scenario, an aircraft is launched similarly to the first scenario; the propeller is deployed, folded during flight, and redeployed in one or more cycles as required for the remainder of the mission.

In a third scenario, the deployable propeller remains collapsed for a gliding operation of the aircraft. Folding the propeller and redeploying is desired when moderate to long glides are possible. These situations include making descents from high altitude with subsequent powered cruise mission segment, or short power off glides for acoustic signature suppression.

The apparatus 100 in one example comprises any (e.g., horizontal, oblique, or vertical) orientation, with the description and figures herein illustrating one example orientation of the apparatus 100, for explanatory purposes.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A deployable propeller having a plane of rotation and an axis of rotation perpendicular to the plane of rotation and parallel to a direction of flight, comprising:
    a central hub operatively coupled to a nose of an aircraft; and
    two or more blades, each operatively coupled to said central hub such that the blades are in the plane of rotation during flight of the aircraft, each blade having a length extending away from the central hub and a width, each blade further comprising:
        a plurality of segments along the length of the blade, each said segment further comprising first and second edges across the width of the blade, wherein adjoining edges of adjacent segments have complementary curvatures, such that the adjoining edges interlock when the propeller is deployed; and one or more flexible hinges connecting the plurality of segments to each other and to the central hub, each flexible hinge further comprising a tensile material such that the plurality of segments lie flat against the nose of the aircraft when the propeller is not deployed.

2. The deployable propeller of claim 1, wherein each blade comprises three segments.

3. The deployable propeller of claim 1, wherein each blade comprises four segments.

4. The deployable propeller of claim 1, wherein the one or more flexible hinges further comprises separate flexible hinges between each segment.

5. The deployable propeller of claim 1, wherein the one or more flexible hinges further comprises a single flexible hinge between the central hub and all of the segments on the side of the blade opposite the direction of flight.

6. The deployable propeller of claim 1, wherein the tensile material is a flexible cloth or tape hinge connecting at least each segment.

7. The deployable propeller of claim 1, wherein the tensile material is one or more tensile fibers that extend through the center of each segment.

8. The deployable propeller of claim 7, wherein the tensile fibers are connected to a spool in the central hub, said spool used to maintain tension on the tensile fiber when the propeller is deployed.

9. The deployable propeller of claim 7, wherein each blade further comprises:
a telescoping faring covering said hinge, said faring resting in a channel in the central hub when the propeller is stored, said faring further sliding over said hinge to cover a gap between the central hub and the first segment when the propeller is deployed.

10. An aircraft, comprising:
a fuselage; and
a deployable propeller according to claim 1.

11. The aircraft of claim 10, wherein the aircraft is an unmanned aerial vehicle.

12. The aircraft of claim 10, wherein the aircraft is launched from a storage container while the propeller is collapsed.

13. A deployable propeller having a plane of rotation and an axis of rotation perpendicular to the plane of rotation and parallel to a direction of flight, comprising:
a central hub operatively coupled to a nose of an aircraft; and
two or more blades, each operatively coupled to said central hub such that the blades are in the plane of rotation during flight of the aircraft, each blade having a length extending away from the central hub and a width, each blade further comprising:
a plurality of segments along the length of the blade, wherein a central hub facing surface of each segment further comprises a hook, and an opposing surface of each segment further comprises a slot for receiving the hook when the propeller is deployed, wherein the blade segments are held in place and aligned correctly; and
one or more flexible hinges connecting the plurality of segments to each other and to the central hub, each flexible hinge further comprising a tensile material such that the plurality of segments lie flat against the nose of the aircraft when the propeller is not deployed.

14. The deployable propeller of claim 13, wherein each blade comprises three segments.

15. The deployable propeller of claim 13, wherein each blade comprises four segments.

16. The deployable propeller of claim 13, wherein the one or more flexible hinges further comprises separate flexible hinges between each segment.

17. The deployable propeller of claim 13, wherein the one or more flexible hinges further comprises a single flexible hinge between the central hub and all of the segments on the side of the blade opposite the direction of flight.

18. An aircraft, comprising:
a fuselage; and
a deployable propeller according to claim 13.

19. The deployable propeller blade of claim 13, wherein the tensile material is a flexible cloth or tape hinge connecting at least each segment.

20. The deployable propeller blade of claim 13, wherein the tensile material is one or more tensile fibers that extend through the center of each segment.

* * * * *